(12) United States Patent
Watanabe

(10) Patent No.: US 6,539,240 B1
(45) Date of Patent: Mar. 25, 2003

(54) DATA COMMUNICATION APPARATUS, DATA COMMUNICATION METHOD, AND STORAGE MEDIUM STORING COMPUTER PROGRAM FOR DATA COMMUNICATION

(75) Inventor: Motomu Watanabe, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/371,251

(22) Filed: Aug. 10, 1999

(30) Foreign Application Priority Data

Aug. 11, 1998 (JP) .......................................... 10-227029

(51) Int. Cl.[7] ................................................ H04Q 7/20
(52) U.S. Cl. ........................ 455/566; 455/76; 455/575; 345/638
(58) Field of Search ................................ 455/566, 575, 455/93, 39, 95, 124, 76, 514, 466, 414, 158.4, 158.5; 345/467, 636, 629, 472.2, 473, 474, 638, 716, 723, 24, 752, 758, 759; 340/7.21, 7.55, 7.56; 348/14.07, 14.01, 158, 552

(56) References Cited

U.S. PATENT DOCUMENTS

| 4,485,400 A | * | 11/1984 | Lemelson et al. ............ 348/14 |
| 5,426,594 A | * | 6/1995 | Wright et al. ................ 709/206 |
| 5,867,795 A | * | 2/1999 | Novis et al. ................. 455/566 |
| 5,870,683 A | * | 2/1999 | Wells et al. ................. 455/566 |
| 5,880,731 A | * | 3/1999 | Liles et al. .................. 345/473 |
| 5,896,575 A | * | 4/1999 | Higginbotham et al. .... 455/566 |
| 5,907,328 A | * | 5/1999 | Brush, II et al. ........... 345/473 |
| 5,914,707 A | * | 6/1999 | Kono .......................... 345/173 |
| 5,956,034 A | * | 9/1999 | Sachs et al. ................. 345/350 |
| 5,977,968 A | * | 11/1999 | Le Blanc .................... 345/339 |
| 6,032,025 A | * | 2/2000 | Sugio et al. ................. 455/7.56 |
| 6,044,248 A | * | 3/2000 | Mochizuki et al. ......... 455/7.56 |
| 6,085,112 A | * | 7/2000 | Kleinschmidt et al. ..... 455/556 |
| 6,097,441 A | * | 8/2000 | Allport ........................ 348/552 |
| 6,119,147 A | * | 9/2000 | Toomey et al. ............. 709/204 |
| 6,349,327 B1 | * | 2/2002 | Tang et al. .................. 345/758 |

* cited by examiner

Primary Examiner—Nay Maung
Assistant Examiner—Jean Alland Gelin
(74) Attorney, Agent, or Firm—Frishauf, Holtz, Goodman & Chick, P.C.

(57) ABSTRACT

It is determined whether or not a receiver responds to a call from a caller. If it is detected that the receiver has responded, a communication channel is maintained, and thereafter two characters respectively representing the caller and receiver are communicated between the caller and receiver. Two characters are synthesized and displayed. The caller and receiver communicate of intentions with each other while letting the self character take a specified action.

28 Claims, 11 Drawing Sheets

FIG.5

| | AUTOMATIC RECEPTION ACTION | | 19 |
|---|---|---|---|
| | PARTNER'S ACTION | RESPONDING ACTION | |
| 1 | WAG TAIL | NOD | |
| 2 | NOD | JUMP | |
| | ⋮ | ⋮ | |

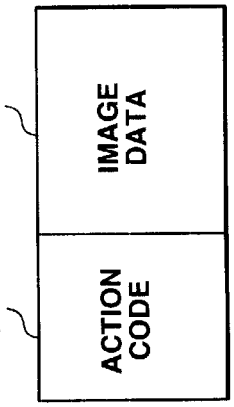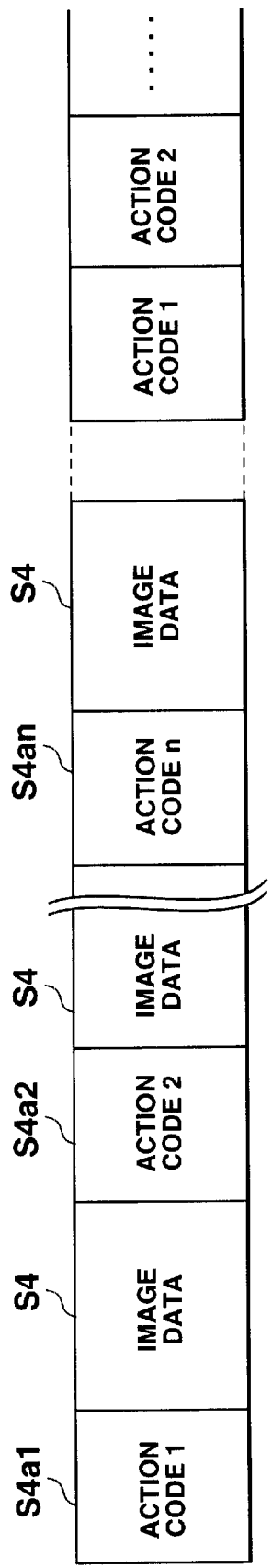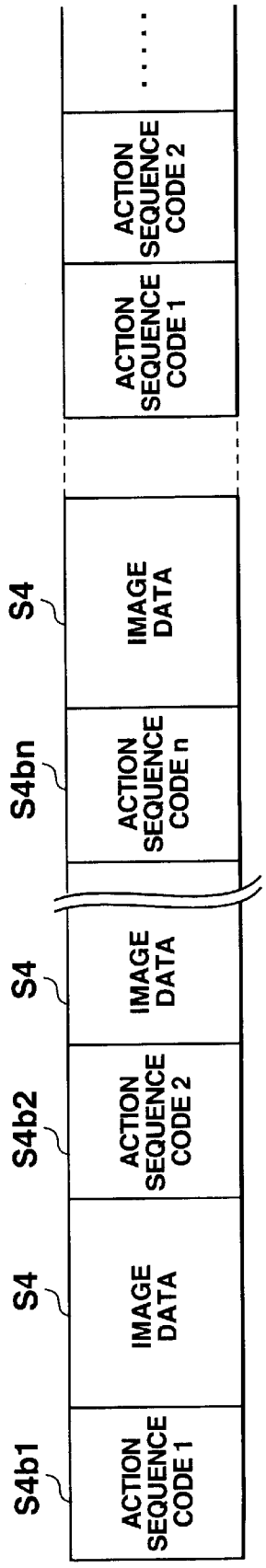

DATA COMMUNICATION APPARATUS, DATA COMMUNICATION METHOD, AND STORAGE MEDIUM STORING COMPUTER PROGRAM FOR DATA COMMUNICATION

BACKGROUND OF THE INVENTION

The present invention relates to a data a communication apparatus, data communication method, and a storage medium storing a computer program for data communication.

This application is based on Japanese Patent Application No. 10-227029, filed Aug. 11, 1998, the content of which is incorporated herein by reference.

Conventionally, infrared optical communication has been used for communication of data such as text and images between portable electronic devices such as electronic notebooks and the like, to make communication concerning intentions between a sender and a receiver. In the devices of this kind, a sender operates parts such as keys and the like to cause changes in text and images on a display device, while a receiver confirms the changes in real time and makes a response thereto in real time. Communication of intentions is thus achieved.

Recently, several service providers have started to provide movable data communication services by movable phones which enable communication of data such as still images, video image, electronic mail, and the like, in addition to voice communication, via communication channels such as ISDN (Integrated Services Digital Network), PHS (Personal Handyphone System: Simplified Cordless Phone System), and the like.

As for communication of intentions using text images by the movable data communication services, it has been considered that communication is made with transmitted data and received data completely separated from each other, e.g., each user transmits data from his or her own device to another user and also receives and displays data transmitted from the other user on the display part of the device. However, no proposal has been made for a data communication service in which data to be transmitted and data to be received are linked integrally with each other to provide users with a new style of communication of intentions. There was proposed an electronic mail service in which an electronic pet is added to an electronic mail and sent with the electronic mail. At the receiver, the pet carrying the mail is displayed on the terminal. However, an activity or a motion of the pet is controlled in a predetermined manner. After sending the mail, the sender cannot control the activity or the motion of the pet.

The data communication service described above is based on a prerequisite that transmission and reception of data are carried out in real time between users. However, it may be considered that communication is not made between portable electronic devices such as electronic notebooks within an area in which the devices can be viewed from each other, like infrared optical communication, but data is transmitted and received between users of movable phones which cannot be viewed from each other, like data communication between movable phones. Or, it may be considered that users are in a situation that they must take heavy burdens to make communication. In these cases, users as communication targets are forced to make difficult communication if real-time communication is a prerequisite.

BRIEF SUMMARY OF THE INVENTION

Accordingly, it is an object of the present invention to provide a data communication apparatus in which very close communication of intentions can be made by simple operation between users of data communication and any communication of intentions between uses can be made even if a receiver cannot make an instantaneous response.

A related object of the present invention is to provide a data communication method in which very close communication of intentions can be made by simple operation between users of data communication and any communication of intentions between uses can be made even if a receiver cannot make an instantaneous response.

A further object of the present invention is to provide a storage medium for storing a computer program for a data communication by which very close communication of intentions can be made by simple operation between users of data communication and any communication of intentions between uses can be made even if a receiver cannot make an instantaneous response.

According to the present invention, there is provided a data communication apparatus comprising a receiver for receiving a first character representing a communication target, an action storage for storing data representing various actions of a second character representing a user, a specifying device for specifying an action of the second character by using an operation member, a transmitter for reading the data of the second character corresponding to the action specified by the specifying device from the action storage and for transmitting the data read from the action storage to the communication target, and a synthesizer for synthesizing the data received by the receiver and the data read from the action storage and for displaying a synthesized image having the first and second characters.

According to the present invention, there is provided another data communication apparatus comprising a receiver for receiving a first character representing a communication target and action information representing an action of the first character, an image storage for storing data representing various actions of a second character representing a user, a response action storage for storing action information of the second character responding to the action information of the first character, and a transmitter for reading the action information of the second character responding to the action information of the first character received by the receiver from the response action storage, for reading the image data corresponding to the action information of the second character from the image storage, and for transmitting the action information read from the response action storage and the image data read from the image storage to the communication target.

According to the present invention, there is provided a data communication method wherein a character corresponding to a user is displayed, when an action of the character is instructed, transmitting image data corresponding to the action.

According to the present invention, there is provided another data communication method comprising the following steps of displaying a character corresponding to a user and taking a predetermined action, transmitting character image data and action identification data corresponding to the predetermined action, and when an action of the character is instructed, transmitting action identification data corresponding to the action.

According to the present invention, there is provided a computer program product comprising a computer readable first program code for receiving image data of a character of a target user, a computer readable second program code, when an action of a character of a user is instructed by operating an operation member, for reading image data corresponding to the instruction from an image data storage, a computer readable third program code for transmitting the read image data of the character of the user to the target user, and a computer readable fourth program code for synthesizing and displaying received image data of the target user and the image data of the character of the user.

According to the present invention, there is provided another computer program product comprising a computer readable first program code for receiving image data and action information of a character of a target user, a computer readable second program code for reading image data of a character of a user corresponding to the action information from image data storage region, a computer readable third program code for transmitting the read image data of the character of the user to target user, and a computer readable fourth program code for synthesizing the received image data and the read image data.

According to the present invention, there is provided a still further data communication method comprising the following steps of determining whether or not a receiver responds to a call from a caller, setting a communication channel between the caller and the receiver if it is detected that the receiver has responded, communicating two characters respectively representing the caller and the receiver between the caller and the receiver, synthesizing two characters and displaying synthesized characters, and making a self character take an action specified by using an operating member and transmitting the self character taking the specified action to other party, thereby communicating of intentions of the caller and the receiver by using the characters taking the specified action.

According to the present invention, there is provided a still further data communication method comprising the following steps of determining whether or not a receiver responds to a call from a caller, setting a communication channel if it is detected that the receiver has not responded, transmitting a first character representing the caller from the caller to the receiver, transmitting a second character corresponding to the caller from the receiver to the caller, making the first character take an action specified by the caller and transmitting the first character taking the action from the caller to the receiver, and making the second character take an action corresponding to the action of the first character and transmitting the second character taking the action from the receiver to the caller.

According to the present invention, very close communication of intentions can be made by simple operation between users of data communication and any communication of intentions between uses can be made even if a receiver cannot make an instantaneous response.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a table showing the contents of setting of the automatic response by the action of a character;

FIGS. 11A, 11B, and 11C are diagrams showing other examples of formats of image data.

DETAILED DESCRIPTION OF THE INVENTION

A preferred embodiment of a data communication apparatus according to the present invention will now be described with reference to the accompanying drawings.

First Embodiment

The embodiment will be explained in case where electronic mails and image data are transmitted and received by PHS. Note that a normal voice processing circuit (voice communication circuit) does not directly relate to the features of the present invention, and therefore, illustrations and explanations thereof will be omitted.

Figure 1:
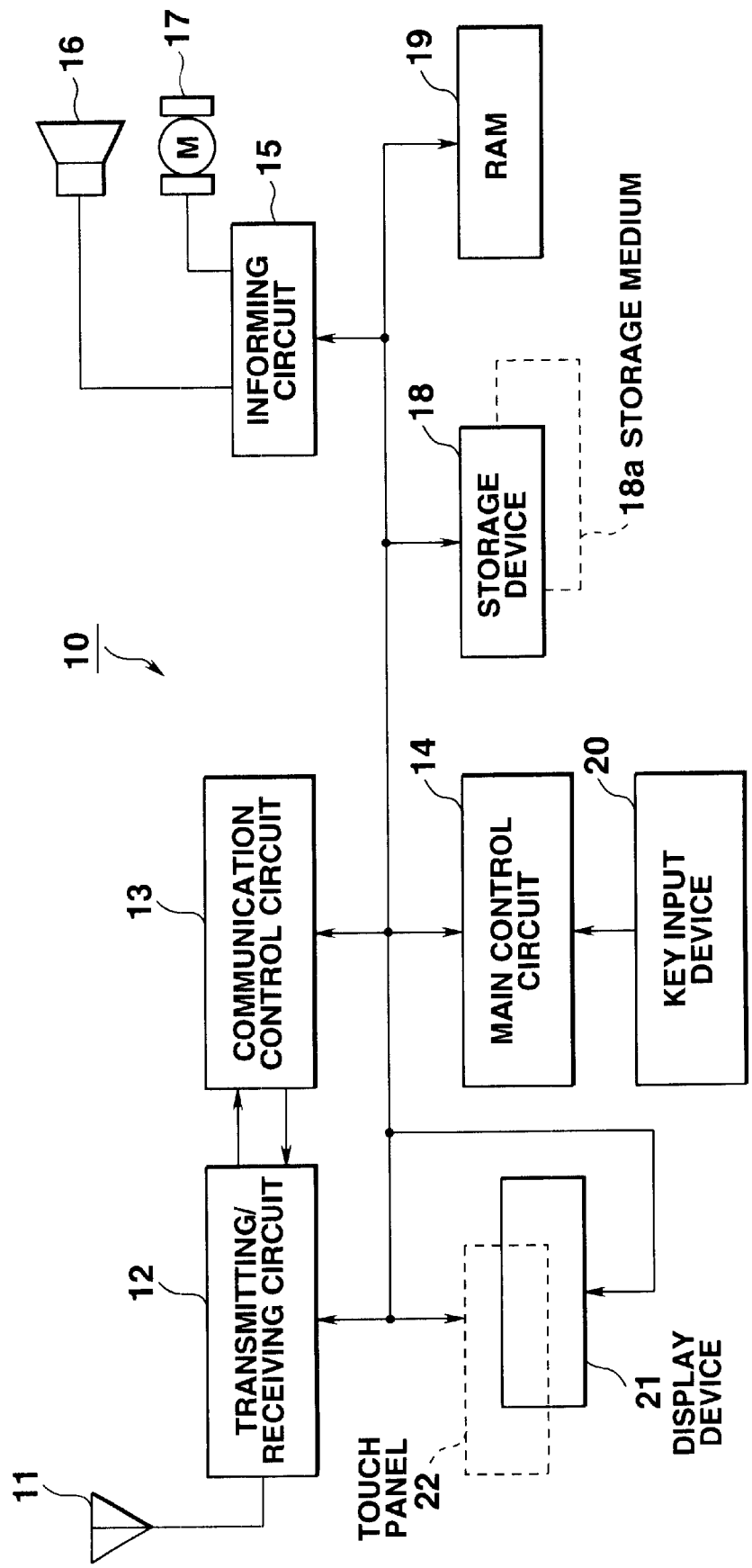
FIG. 1 is a block diagram showing a first embodiment of a data communication apparatus according to the present invention.

FIG. 1 shows a circuit configuration of a portable communication apparatus 10 as an embodiment of the data communication apparatus. A transmitting/receiving circuit 12 is connected through an antenna switch (not shown) for switching a transmitting/receiving system to an antenna 11. The transmitting/receiving circuit 12 is comprised of a frequency converter and a modem. In the receiving system, a signal (a band of 1.9 GHz) received by the antenna 11 is inputted to the frequency converter through the antenna switch. The received signal is mixed with a reception local oscillation signal of a predetermined frequency outputted from a PLL synthesizer (not shown) and is thereby subjected to frequency-conversion (down-conversion) into an IF signal at 1 MHz. Meanwhile, in the transmitting system, a modulated signal (a band of 1 MHz) of π/4 shift QPSK outputted from the modem is inputted to the frequency converter. This modulated signal is mixed with a transmission local oscillation signal of a predetermined frequency outputted from the PLL synthesizer and is thereby subjected to frequency-conversion (up-conversion) into a signal at a band of 1.9 GHz. The signal is radiated from the antenna 11.

Further, in the receiving system, the IF signal from the frequency converter is demodulated by the modem to reproduce a data stream and the data stream is inputted to a communication control circuit 13. Meanwhile, in the transmitting system, a data stream transferred from the communication control circuit 13 is subjected to π/4 shift QPSK modulation, and is supplied to the frequency converter.

The communication control circuit 13 performs frame-synchronization and data-format-processing of data slots. In the receiving system, data for one slot is extracted at a predetermined timing from received data supplied from the modem of the transmitting/receiving circuit 12. A unique word (synchronization signal) is extracted from the data to make synchronization, and scramble of control data and communication data in the received data is descrambled. Thereafter, the control data and communication data are supplied to a main control circuit 14 which will be described later. Meanwhile, in the transmitting system, control data or the like is added to communication data supplied from the main control circuit 14, and scrambling or the like is effected thereon. Thereafter, a unique word or the like is added thereto to prepare transmission data for one slot, which is inserted at a predetermined timing into a predetermined slot in a frame and is then supplied to the modem of the transmitting/receiving circuit 12.

The control circuit 14 is connected with an informing circuit 15, a storage device 18, a RAM 19, a key input device 20, a display device 21, and a touch panel 22.

The control circuit 14 is comprised of a CPU and the like, and controls the entire apparatus based on a predetermined communication protocol. The storage device 18 contains a storage medium 18a which stores a control operation program for the control circuit 14 including transmission/reception of text data expressing a message, dot pattern data corresponding to text codes, image data expressing a character, and the like. The RAM 19 has a transmission buffer and a reception buffer for temporarily storing data containing communication data under control of the control circuit 14, an image storage area for storing image data obtained through data communication, a flag register for setting various status flags, various counters, and the like. Backup power is supplied for at least the image storage area of the RAM 19, so that the storage contents can be maintained even while the power is off.

The storage medium 18a is constructed by a magnetic or optical storage medium or by a semiconductor memory. The storage medium 18a is fixedly provided or detachably attached. The program, data and the like stored in the storage medium 18a may be received from another device connected through a communication channel or the like and stored therein. Further, the storage medium 18a may be provided in another party connected through a communication channel or the like, and the program, data, and the like stored in the storage medium 18a may be transmitted to a self apparatus through the communication channel.

The informing circuit 15 drives at least one of a speaker 16 and a vibrator 17 in accordance with setting conditions upon receipt of a signal, thereby to notify a receipt of a signal by a buzzer sound or a vibration.

A key input device 20 has operation members such as a dial key for inputting a key operation signal for setting respective functions to the control circuit 14, a "COMMUNICATION" key, an "OFF" key, a "REPRODUCE" key, a cursor key, and the like.

The display device 21 is constructed, for example, by a liquid crystal display panel of dot matrix type and a drive circuit thereof, and displays input data for various control, results of processing, image data, and the like.

The touch panel 22 is provided in form of a transparent film integrally attached on the display device 21. When a user makes a touch operation at positions on the display screen with a finger or a special stylus pen (not shown), coordinate data concerning the position touched by the operation is supplied to the control circuit 14, thereby to input texts and the like to prepare a message.

Although not shown in the drawing, a voice conversation circuit is also comprised. However, since this circuit does not relate to features of the present invention, explanation thereof will be omitted.

Next, operation of the present invention will be explained.

Figure 2:
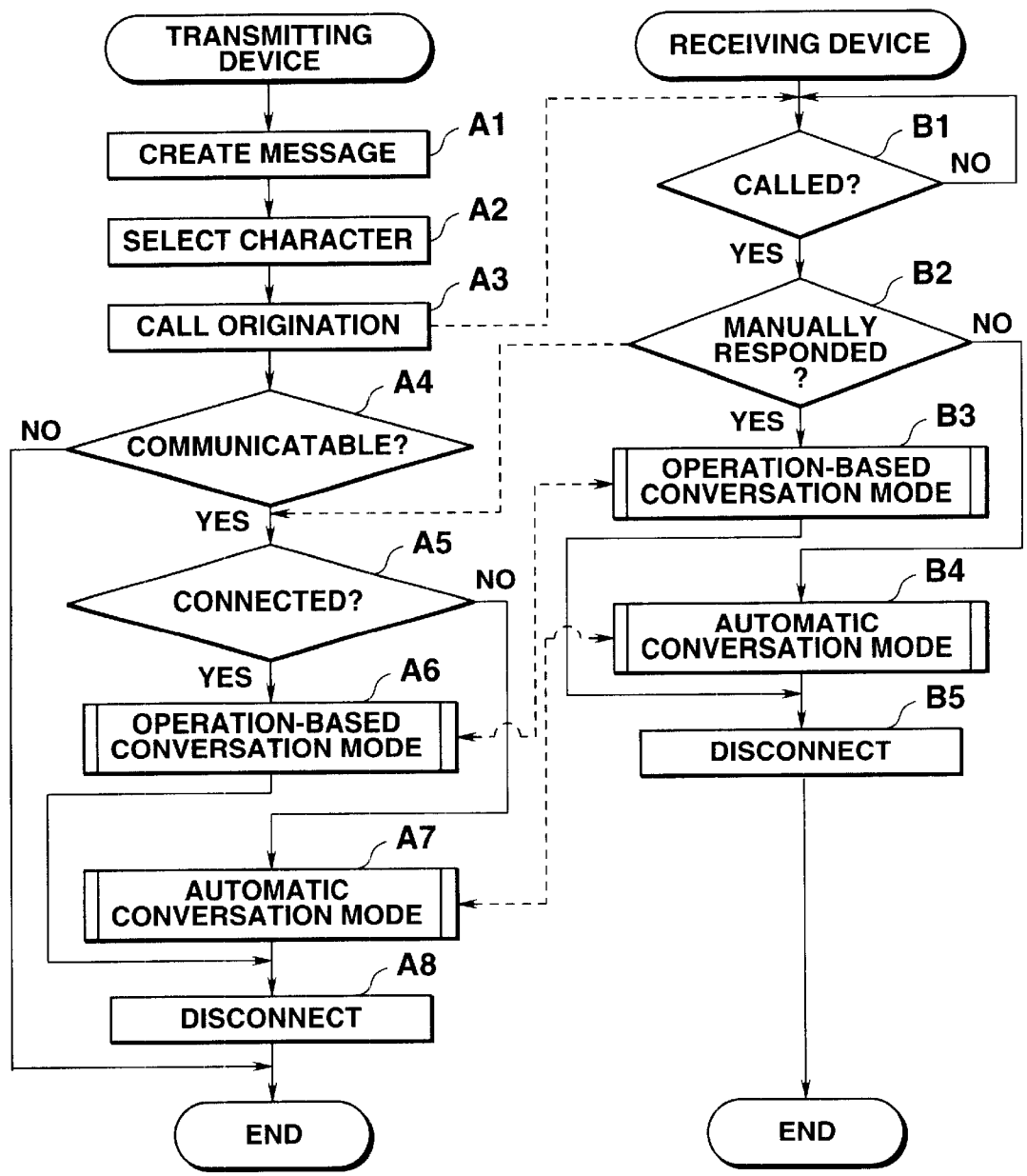
FIG. 2 is a flowchart showing the main routine operations in both the transmitting communication device and receiving communication device.

FIG. 2 is a flowchart showing the contents of main processing in case where an arbitrary character is used to make communication of intentions between two portable communication devices 10 via a radio communication channel. The program which realizes respective functions described in this flowchart is stored in the storage medium 18a in form of program codes which are readable by the control circuits 14 (CPUs) of both portable communication devices 10.

Figure 6A:
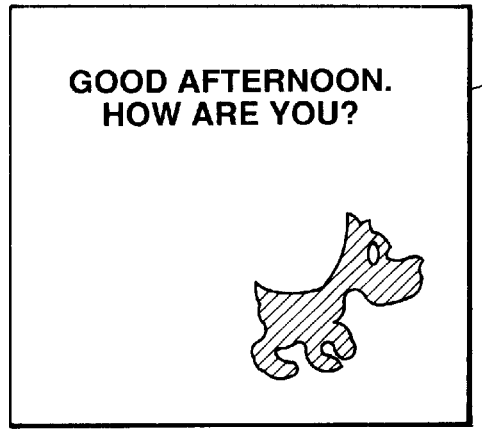
FIGS. 6A, 6B, and 6C are views showing examples of display screens.

At first, in the transmitting communication device 10, texts of a message ("GOOD AFTERNOON. HOW ARE YOU?" in this case) to be inserted into image data transmitted between the receiving communication device 10 are sequentially inputted (step A1). Next, a character (a dog in this case) taking role of the transmitting person to be displayed in the image data and an action of the character (an action of holding a mail in its mouth and bringing it to the receiving person) are selected (step A2). These message and character are displayed on the display device 21 in the transmitting communication device. FIG. 6A shows an example of display on the display device 21 in the transmitting communication device. The dot pattern of the message "GOOD AFTERNOON. HOW ARE YOU?" inputted as a text is developed and displayed, and simultaneously, the "dog" as a character takes a "normal" action.

For example, an item of image data used herein is of longitudinal 130 dots×lateral 192 dots, although the size is determined in accordance with the mail transmission protocol defined between PHS terminals and mail centers of the service provider.

Figure 4:
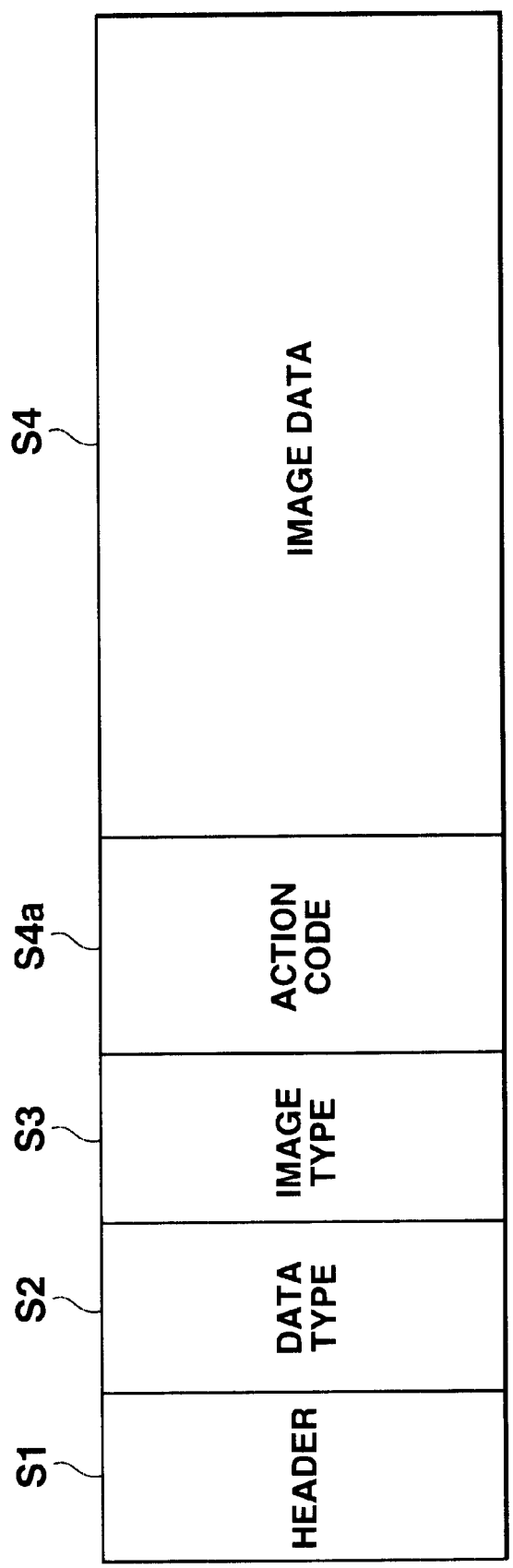
FIG. 4 is a diagram showing the structure of the format of image data.

The control circuit 14 creates transmission data in the data format as shown in FIG. 4, for example, from the image data as described above. That is, in transmission data in this data format, a data type identification code S2 which indicates a data type, such as a text, an image, or a mixture of text and image, is added subsequently to a header S1 provided at the top of data. Further, subsequently added is an image type identification code S3 which indicates an image type, such as a bit map image, a JPEG image, or an MPEG image. Finally, added is communication data (in this case image data) S4 of the longitudinal 130 dots×lateral 192 dots described above. At the beginning of the image data S4, provided is an action type identification code S4a which indicates the action of the character.

If text data is transmitted instead of image data, a text (or a mixture of text and image) is set to the data type identification code S2 and text data is set to the communication data S4. Thus, the text data can be transmitted along with the image data or aside from the image data.

The above format is a mere example and may be arbitrary modified such that the ID data S2, S3, and S4a are included in the header S1 or other option ID data can be set.

After preparation of the transmission data, the telephone number of a destination is selected and a "COMMUNICATION" key of the key input device 20 is operated to execute transmission. Then, a call is originated through a nearest base station to the communication device 10 in the transmitting communication device.

Thereafter, whether or not a destination receiver is within a communication range is determined depending on whether or not a response is transmitted from the destination receiver (step A4). If there is no response from the destination receiver, it is possible to consider a situation that the destination receiver is at a position out of the communication range, which electric waves cannot reach, or the main power switch of the device is set off. Then, the communication is abandoned and this processing is terminated. If there is a response from the destination receiver, the processing goes to step A5.

Meanwhile, the receiving communication device 10 always waits for a call in step B1 in a normal waiting mode. At the time point when it is determined that a call has been made, at least one of the speaker 16 and the vibrator 17 is driven by the informing circuit 15 in accordance with the setting made by the user of the portable communication device 10, to notify the user that a call has been made, by a buzzer sound or a vibration. Thereafter, whether or not the user will respond is determined depending on whether or not the "COMMUNICATION" key of the key input device 20 is pushed or operated within a predetermined time in response to this notification (step B2). If it is determined that the "COMMUNICATION" key has not been operated by the user, the program goes to an automatic conversation mode based on an automatic response in accordance with key operations by the user of the transmitting communication device 10 (step B4).

Meanwhile, in the transmitting communication device, if it is determined at step A4 that the receiving communication device 10 is within the communication range, it is determined at step A5 whether or not the channel is connected within a predetermined time is determined, i.e., whether or not a response is made from the user of the target receiving communication device is determined. If it is determined that there has not been a response within a predetermined time, the processing goes to the automatic conversation mode in accordance with the automatic response from the receiving communication device (step A7).

Figure 3:
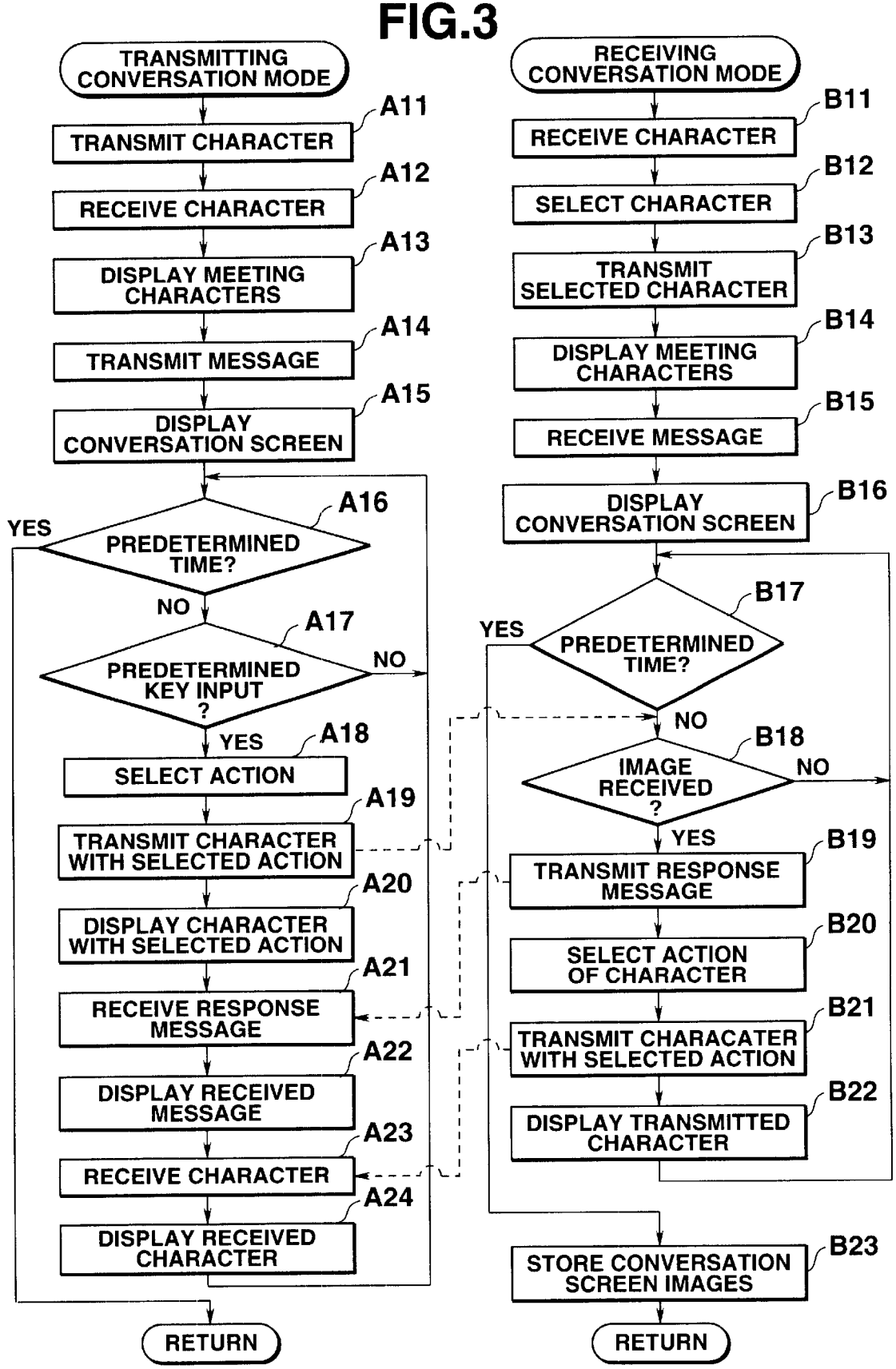
FIG. 3 is a flowchart showing sub-routine operations of automatic conversation mode in both the transmitting communication device and receiving communication device.

FIG. 3 shows specific contents of the automatic conversation mode in accordance with the automatic response from the receiving communication device in steps A7 and B4.

At first, image data including the character (a dog in this case) is transmitted from the transmitting communication device 10 in the format shown in FIG. 4 (step A11).

The receiving communication device 10 receives the data (step B11) and automatically selects a character (an elephant in this case) which serves the character of the transmitting communication device. Thus, assume that characters as servers corresponding to a plurality of telephone numbers are previously set in the RAM 19 and that the control circuit 14 reads image data of a corresponding character, referring to the contents of the RAM, depending on the telephone number of the transmitting communication device 10.

Based on the character image data thus read out, transmitting data in the format shown in FIG. 4 is created and is transmitted by return to the transmitting communication device 10 (step B13). The received image data and the image data transmitted by return are superimposed on each other, and a predetermined image processing is effected thereon, so the display device 21 of the receiving communication device 10 displays an image that two characters meet each other (step B14).

Figure 6B:
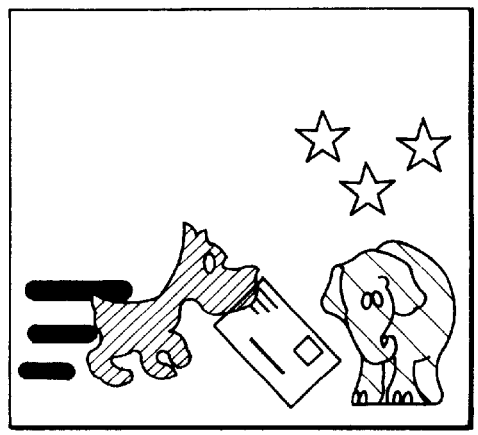

FIG. 6B shows an example of the image displayed at this time, in which the character "DOG" taking role of the transmitting user meets the character "ELEPHANT" taking role of the receiving user. In this case, the character "DOG" in the transmitting communication device is displayed with an image of a mail added in its mouth and with an image of three lateral parallel lines added behind the character. In this manner, it is expressed that the character "DOG" of the caller brings a message to the user of the receiving communication device. In addition, additional images of three stars are further displayed above the character "ELEPHANT" express that the character "ELEPHANT" of the receiving communication device welcomes the arrival of the message. Though additional images such as lines and stars express a motion or feeling of the character in FIG. 6B, it is also possible to display the character in animation.

Meanwhile, the transmitting communication device 10 receives the image data of the "ELEPHANT" transmitted by return from the receiving communication device (step A12), after the image data is transmitted in step A11. With use of this image data transmitted by return, an image as shown in FIG. 6B, which expresses two characters meeting each other, is displayed on the display device 21 in the transmitting communication device (step A13).

Thereafter, text data forming the message created in step A1 is transmitted to the receiving communication device like in the above-described case of the image data (step A14), and the dot pattern of the transmitted message is developed and displayed together with the two characters "DOG" and "ELEPHANT", on the display device 21 in the transmitting communication device. In this manner, a scene that the character "DOG" says the message "GOOD AFTERNOON. HOW ARE YOU?" to the character "ELEPHANT" is displayed (step A15). Thereafter, processing (step A17) of waiting an operation on a predetermined key included in the key input device 20 while confirming (step A16) that the image communication depending on the automatic response from the receiving communication device has not spent a predetermined time from when the channel was connected is repeatedly executed.

In the receiving communication device 10 after the image expressing two characters meeting each other was displayed, text data of a message from the transmitting communication device is received (step B15) and the dot pattern of the message is developed and displayed together with the two characters "DOG" and "ELEPHANT" (step B16). Thereafter, processing (step B18) of waiting image data from the transmitting communication device (in correspondence with the key operated in step A17) while confirming (step B17) that the image communication has not spent a predetermined time from when the channel was connected is repeatedly executed.

In the transmitting communication device 10, the user can let the character taking role of himself or herself take a predetermined action by operating a predetermined key of the key input device 20. If it is determined at step A17 that a predetermined key has been operated, an image of the character taking an action corresponding to the operated key (or a sequence of images corresponding to the action) is selected and read out (step A18). In place of the character which has taken a role of the user before, transmitting data of the format shown in FIG. 4 depending on the image thus read out is created and transmitted to the receiving communication device (step A19), and is also displayed on the display device 21 (step A20).

Figure 6C:

FIG. 6C shows an example of an image displayed on the display device 21 of the transmitting communication device 10 at this time, expressing that an image of a "DOG" taking role of the user of the transmitting communication device wagging its tail in response to the key operation has been transmitted.

Meanwhile, in the receiving communication device 10, text data forming a predetermined response message selected from response messages previously set in the RAM 19 is transmitted to the transmitting communication device (step B19), at the time point when it is determined that the image data transmitted in step B18 has been received.

Thereafter, an image of the character taking an action corresponding to the action identification code S4a added to the top position of the image data S4 in the image data received in step B18 is selected and read out (step S20).

FIG. 5 shows an example of response operation of the self character (in the receiving communication device in this case) to the action of the partner's character (in the transmitting side in this case), stored in the RAM 19 of the receiving communication device 10. In practice, this operation is stored in form of an action identification code S4a in the RAM 19. For example, if the action identification code S4a in the received image data corresponds to "WAG TAIL", an action identification code S4a corresponding to "NOD" is read out and an image of the character expressing the action "NOD" is selected and read out. If the action identification code S4a corresponds to "NOD", an action identification code S4a corresponding to "JUMP" is read out and an image of the character expressing the action "JUMP" is selected and read out.

Further, transmitting data in the format shown in FIG. 4 depending on the image thus read is created is newly transmitted to the transmitting communication device (step B21), in place of the user's character which has been displayed before, and is displayed on the display device 21 of the receiving communication device (step B22). The processing then returns to the processing after step B17 again.

In the transmitting communication device 10, after the image of the character taking the action corresponding to the key operation in step A20 is displayed, text data of the response message is received from the transmitting communication device (step A21), and the dot pattern of the response message received together with the two characters "DOG" and "ELEPHANT" is developed and displayed (step A22).

Thereafter, the image data of the character transmitted from the receiving communication device in response to the key operation in the transmitting communication device is received (step A23), and the newly received image data is displayed on the display device 21, in place of the character of the transmitting communication device (step A24).

Figure 7A:
FIGS. 7A, 7B, and 7C are views showing examples of display screens.

FIG. 7A shows an example of the image displayed on the display device 21 of the transmitting communication device, expressing that an image expressing symbolically that the character "ELEPHANT" of the receiving communication device nods in response to the key operation instructing the action of "WAG TAIL" in the transmitting communication device as well as a response message "I am sorry not to respond now. My pet responds instead" have been received. Two curves in the left side of the elephant express the action of nodding.

Thereafter, in the transmitting communication device 10, the processing returns to step A16, and a key operation for making the character of the transmitting communication device take an arbitrary action is made. Then, not only a subsidiary screen showing the action is displayed on the display device 21 of the transmitting communication device, but also the image data thereof is transmitted to the receiving communication device 10. In addition, if corresponding image data of the character of the receiving communication device is transmitted by return, the image data is displayed on the display device 21.

Figure 7B:
Figure 7C:
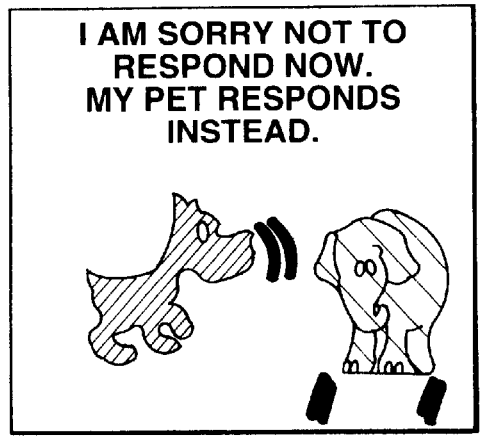

FIG. 7B shows that a key operation for making the character "DOG" of the transmitting communication device mod is made from the state displayed in FIG. 7A. In response to this operation, the receiving communication device automatically sends transmitting data containing a subsidiary image (left and right two lines below the elephant) indicating that the character "ELEPHANT" of the receiving communication device jumps as shown in FIG. 7C. Therefore, even in case where the user of the receiving communication device 10 cannot respond, communication of intentions can be made in a simplified or automatic manner. At this time, not only communication depending on image data using an action of a character is made but also text data corresponding to the action may be sent. Though additional images such as lines express a motion or feeling of the character in FIG. 7B, it is also possible to display the character in animation.

Further, in the transmitting communication device 10, if it is determined at step A16 that a predetermined time has elapsed from when the channel was connected, the subroutine shown in FIG. 3 is terminated and the processing returns to the main routine shown in FIG. 2, in which processing for disconnecting the channel is executed (step A8). The processing of the main routine is then terminated.

Also, in the receiving communication device 10, if it is determined at step B17 that a predetermined time has elapsed from when the channel was connected, a series of image data items which have been transmitted from the transmitting communication device and received are stored orderly into the RAM 19 (step B23). Thereafter, the subroutine shown in FIG. 3 is terminated and the processing returns to the main routine shown in FIG. 2, in which processing for disconnecting the channel is executed (step B5). The processing of the main routine is then terminated.

Figure 8:
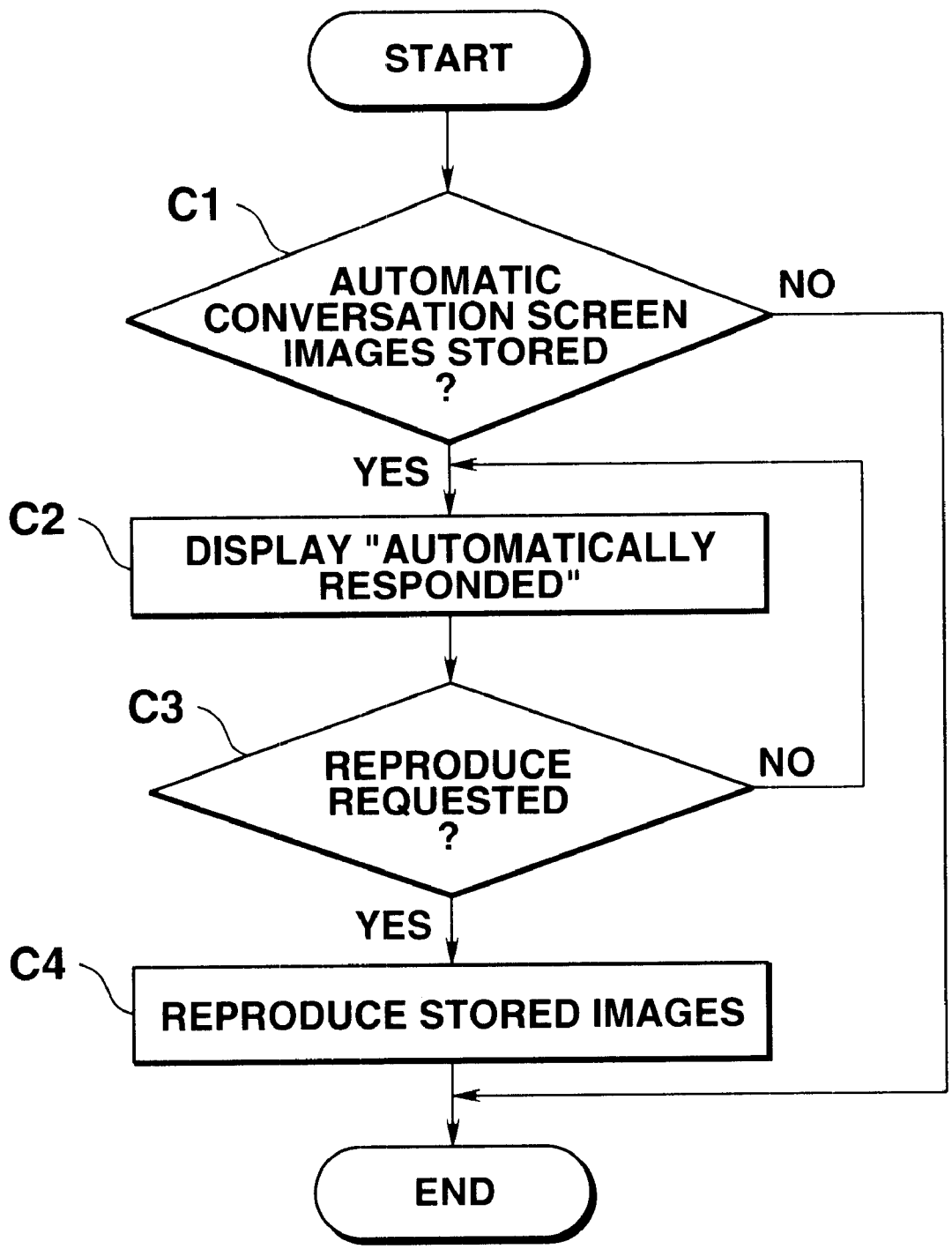
FIG. 8 is a flowchart explaining the operation in the receiving communication device.

In the communication device 10, when the processing goes again to the waiting operation, the processing shown in FIG. 8 is executed in parallel.

At first, it is determined whether or not the character of the caller and the image data dealt with through the automatic conversation by an automatic response have been stored (step C1).

If it is determined that there is no stored data, the processing shown in FIG. 8 is terminated. If it is determined that there is image data stored, the processing of displaying (step C2) the presence of an automatic response on the display device 21 and of waiting (step C3) a key operation for requesting reproduction of the series of stored image data items is repeatedly executed.

Further, if it is determined that the key operation has been made by the user in step C3, the series of stored data items are sequentially read out and displayed on the display device 21, and communications of image data with the transmitting communication device are reproduced (step C4). Then, this processing is terminated.

Therefore, the user of the receiving communication device 10 guesses the intention of the user of the transmitting communication device 10, from the communications of image data, and can then have any later contact with the user of the transmitting communication device 10. Even though an instantaneous response could not be made at the time point when a call was received from the transmitting communication device, the user in the receiving communication device can have real-time communication later with the user in the transmitting communication device.

Referring back to the explanation to the flowchart shown in FIG. 2, if the receiving communication device 10 determines that a response has been made within a predetermined time in step B2, the program goes to an operation-based conversation mode for a real-time communication processing (step B3).

In the transmitting communication device 10, if it is determined at step A5 that a channel was connected within a predetermined time and a response from the user of the receiving communication device 10 has been made within a predetermined time, the program goes to an operation-based conversation mode for a real-time communication processing (step A6).

Figure 9:
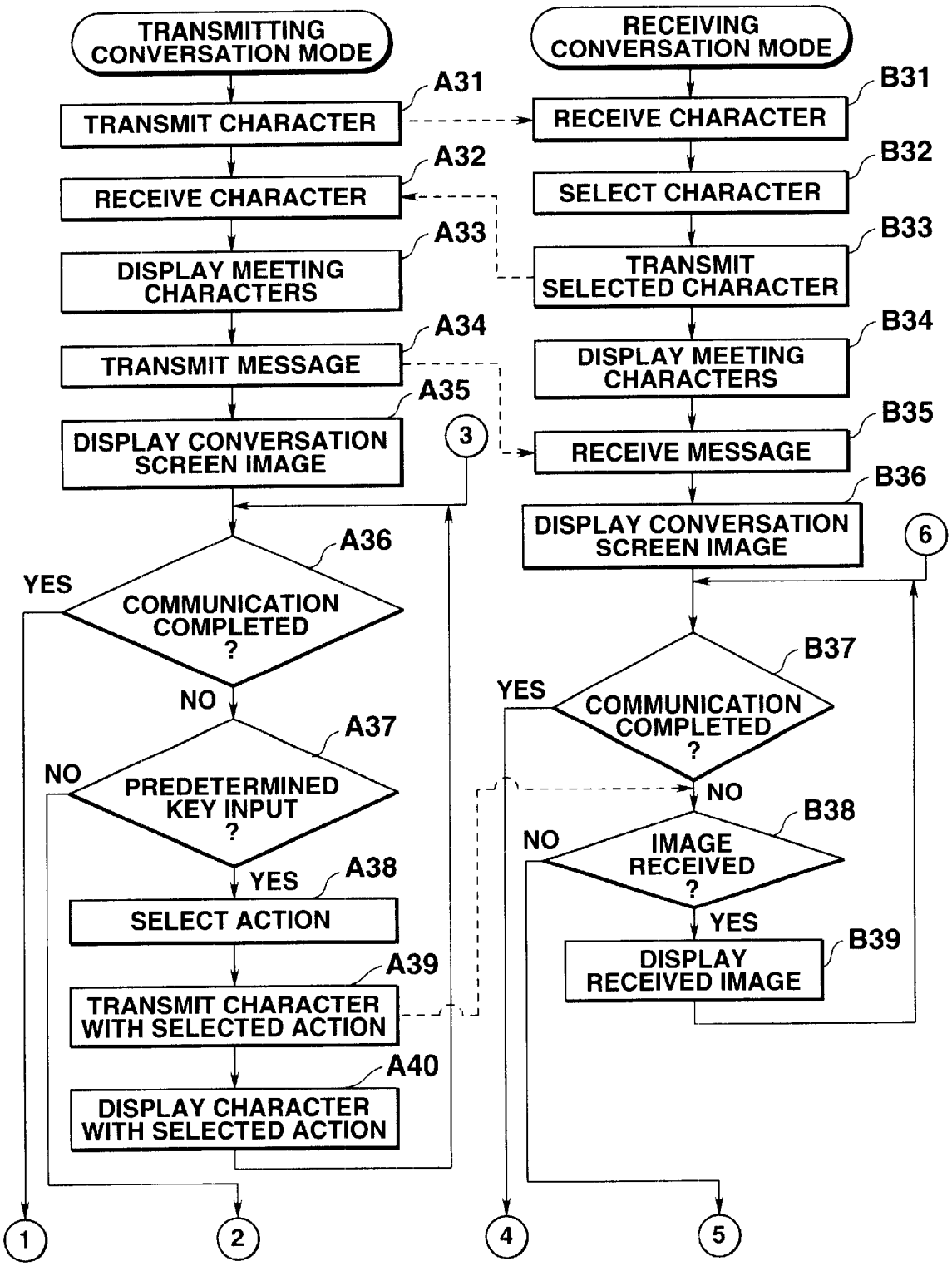
FIG. 9 is a flowchart showing sub-routine operations of operation-based conversation mode in both the transmitting communication device and the receiving communication device.
Figure 10:
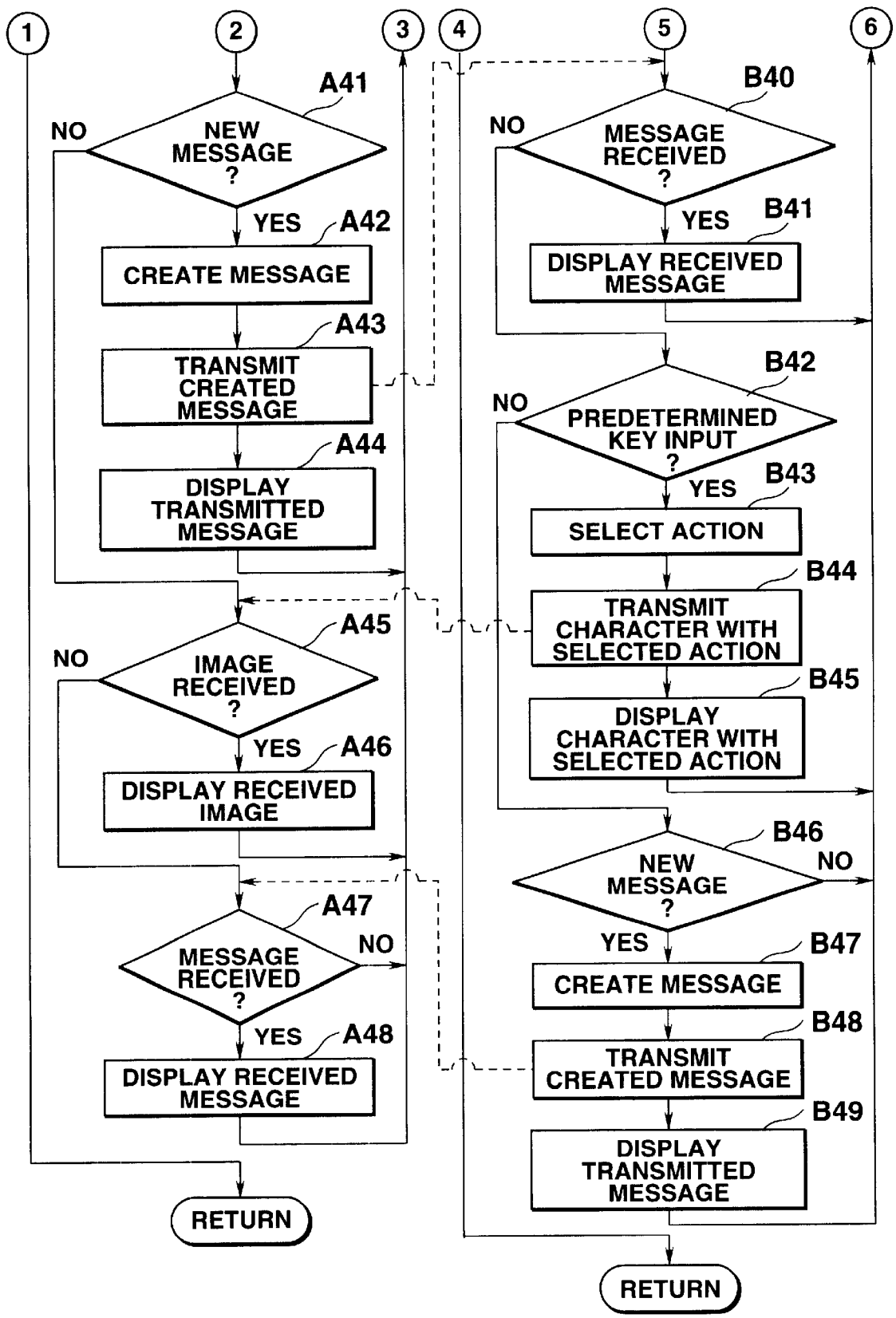
FIG. 10 is a flowchart showing sub-routine operations of the operation-based conversation mode in both the transmitting communication device and the receiving communication device, subsequent to FIG. 9.

FIGS. 9 and 10 show the details of the real-time communication processing (an operation-based conversation mode) in steps A6 and B3.

At first, transmitting data containing the character image data is transmitted in the format shown in FIG. 4 (step A31) from the transmitting communication device 10. The receiving communication device 10 receives this image data (step B31) and automatically selects a character which serves. Characters which serve have previously been set in the RAM 19 by the user of the receiving communication device 10, in correspondence with a plurality of telephone numbers, and the control circuit 14 reads image data of a corresponding character based on the transmitted telephone number of the transmitting communication device 10, referring to the contents of the RAM 19 (step B32). It is possible to freely read out the character from the RAM 19 into which the character has been stored previously.

Based on the character image data thus read out, transmitting data in the format shown in FIG. 4 is created and is transmitted by return to the transmitting communication device 10 (step B33). The received image data and the image data transmitted by return are superimposed on each, and a predetermined image processing is effected thereon, to display, on the display 21 of the receiving communication device, an image showing two characters meeting each other as shown in FIG. 6B (step B34).

Meanwhile, also the transmitting communication device 10 receives the image data of the character transmitted by return from the receiving communication device (step A32), after the image data is transmitted to the receiving communication device in step A31. With use of this image data transmitted by return, an image as shown in FIG. 6B, which expresses two characters meeting each other, is displayed on the display device 21 (step A33).

Thereafter, text data forming the message created in step A1 is transmitted to the receiving communication device like in the above-described case of the character image data (step A34), and the dot pattern of the transmitted message is developed and displayed together with the two characters, on the display device 21 in the transmitting communication device. In this manner, a scene that the character of the transmitting communication device says the message to the character is displayed (step A35).

Further, depending on whether or not any of "OFF" keys of the key input devices 20 in the transmitting communication device and the receiving communication device is operated, it is determined at step A36 whether or not the user wishes to terminate communication. If the communication is not to be terminated, it is determined at step A37 whether or not a predetermined key of the key input device 20, for instructing an action to be taken by the character of the transmitting communication device, is operated. If the predetermined key has not been operated, it is determined at step A41 whether or not another message should be newly created and transmitted. If no new message is needed, it is determined at step A45 whether or not image data has been transmitted from the receiving communication device. If there is no transmitted image, it is determined at step A47 whether or not message data has been transmitted from the receiving communication device. If message data has not been received, the processing returns to step A36 of determining termination of the communication.

In the receiving communication device 10, after the image expressing two characters meeting each other is displayed in step B34, it is determined at step B37 whether or not the user wishes to terminate communication depending on whether or not any of "OFF" keys of the key input devices 20 in the transmitting communication device and the receiving communication device is operated. If the communication should not be terminated, it is determined at step B38 whether or not image data has been transmitted from the transmitting communication device. If no image data has been transmitted, it is determined at step B40 whether or not message data has been transmitted from the transmitting communication device. If no message has been received, it is determined at step B42 whether or not a predetermined key of the key input device 20, for instructing an action to be taken by the character of the receiving communication device, has been operated. If the predetermined key has not been operated, it is determined at step B46 whether or not another message should be newly created and transmitted. If no new message need be transmitted, the processing returns to step B37 of determining termination of the communication.

In the transmitting communication device 10, the user can let his or her character take a predetermined action by operating a predetermined key of the key input device 20. If it is determined at step A37 that the key operation is made, an image of the character taking an action corresponding to the operated key is selected and read out (step A38). In place of the character which has been the user's character before, transmitting data in the format shown in FIG. 4 depending on the character image read out is created and transmitted newly to the receiving communication device (step A39), and is also displayed on the display device 21 (step A40). The flow then returns to the processing from step A36 to wait for a next operation.

Meanwhile, upon receipt of the image data (step B38) transmitted from the transmitting communication device, the receiving communication device 10 displays at step B39 this received image data on the display device 21, in place of the image data which has been displayed and then returns to the processing from step B37 to wait for a next operation.

Also, in the transmitting communication device 10, if it is determined at step A41 that a predetermined key is operated to newly create and transmit another message, the new message is created at step A42 by operating the touch panel 22 so as to correspond to a keyboard displayed on the display device 21. Text code data of the created message is transmitted to the receiving communication device (step A43), and thereafter, the dot pattern of the transmitted message is developed and displayed together with the two characters described above (step A44). Then, the flow returns to the processing from step A36 to wait for a next operation.

Meanwhile, upon receipt of the message depending on the text code data transmitted from the transmitting communication device (step B40), the receiving communication device 10 develops the dot pattern of the text code data of the message and displays it together with the two characters (step B41). Then, the flow returns to the processing from step B37 to wait for a next operation.

Also, in the receiving communication device 10, in case where a predetermined key of the key input device 20 is operated in step B42 to let the character of the receiving communication device in the displayed image take an arbitrary action, the image of the character taking the action corresponding to the operated key is selected and read out (step B43), like in the case of the transmitting communication device. In place of the image which has taking role of the user in this side before, transmitting data in the format shown in FIG. 4 depending on the character image data thus read out is newly created and transmitted to the transmitting communication device (step B44) and is displayed on the display device 21 (step B45). Then, the flow returns to the processing from step B37 to wait for a next operation.

Upon receipt of the character image data transmitted from the receiving communication device in step A45, the transmitting communication device 10 displays the received image data on the display device 21, in place of the image data from the transmitting communication device which has been displayed before (step A46). Then, the flow returns to the processing from step A36 to wait for a next operation.

In the receiving communication device, if it is determined at step B46 that a predetermined key is operated to newly create and transmit another message, the new message is created at step B47 by operating the touch panel 22 so as to correspond to a keyboard displayed on the display device 21, like in the case of the transmitting communication device. Text code data of the created message is transmitted to the transmitting communication device (step B48), and thereafter, the dot pattern of the transmitted message is developed and displayed together with the two characters described above (step B49). Then, the flow returns to the processing from step B37 to wait for a next operation.

The transmitting communication device 10 receives the message depending on the text code data transmitted from the receiving communication device (step A47), then develops the dot pattern of the received text code data of the message, and displays the dot pattern together with the two characters (step A48). Then, the flow returns to the processing from step A36 to wait for a next operation.

Further, in the transmitting communication device 10, if it is determined at step A36 that the "OFF" key of the key input device for terminating the communication is operated, the sub-routine shown in FIGS. 9 and 10 is then terminated. At the same time, the flow returns to the main routine shown in FIG. 2, and processing for disconnecting the channel is executed (step A8). The processing of the main routine is then terminated.

Likewise, in the receiving communication device 10, if it is determined at step B37 that the "OFF" key of the key input device for terminating the communication is operated, the sub-routine shown in FIGS. 9 and 10 is then terminated. At the same time, the flow returns to the main routine shown in FIG. 2, and processing for disconnecting the channel is executed (step A8). The processing of the main routine is then terminated.

Thus, in an operation-based real-time communication of intentions, display is achieved as if two characters actually face each other and have a conversation with each other on real time. By operating predetermined keys of the key input devices, the users in both sides can respectively transmit image data items expressing their own characters taking predetermined actions. As a result, each user can achieve real-time communication of intentions with the other user, through actions of the characters and messages.

The present invention is not limited to the above embodiment but can be variously modified in practice. For example, as for transmission and reception of image data, although the above embodiment has been explained such that one item of image data (bitmap data) S4 with an action identification code S4a added to the top position of the image data is transmitted every time. However, as shown in FIG. 11B, a plurality of image data items respectively containing action identification codes S4a (S4a1 to S4an) indicating all actions of the character of each side may be transmitted and received between both sides and stored in a memory at the beginning of communication. Thereafter, only the action identification codes S4a1 to S4an may be transmitted and received but transmission and receipt of the image data S4 may be omitted.

In this manner, if a character repeat one action, image data need not be transmitted with respect to an action for the second or later time, and thus, efficient data communication can be realized by reducing the amount of data to be transmitted and received.

Also, in place of using a subsidiary image (including double lines) expressing an action as shown in FIGS. 7A, 7B, and 7C, a plurality of images may be used to express an action like an animation. In this case, as shown in FIG. 11C, a plurality of animation images expressing an action of the character of each of the transmitting communication device and the receiving communication device, with action sequence identification codes S4b (S4b1 to S4bn) added, are transmitted and received between both sides and stored in a memory at the beginning of communication. Thereafter, transmission and reception of image data S4 for every action are omitted but only the action sequence identification codes S4b1 to S4bn may be transmitted and received.

In this manner, an action of each character can be displayed by an animation image without increasing much the amount of data to be transmitted and received. It is thus possible to have realer communication of intentions.

Further, it is possible to program a motion of the character (e.g., Java) and the program is transmitted to and stored in the receiving communication device. The transmitting communication device can control the motion of the character displayed on the display of the receiving communication device by only sending a control command for the program.

The above-mentioned embodiment shows the case of applying the invention to portable communication devices which transmit and receive text data and image data. However, the present invention is not limited hitherto but is easily applicable to any communication devices that are capable of transmitting and receiving data.

Also, the communication channels are not limited to PHS communication channels but the present invention is applicable also to PSTN (Public Switched Telephone Network), ISDN (Integrated Services Digital Network), a portable telephone network, a pager communication network, and the like.

Further, when transmitting a character, a bitmap image need not always be transmitted. If characters and actions used by a data communication service are specified previously, a code specifying the character or a code specifying an action of the character may be transmitted and a bitmap may then be developed in the receiving communication device.

Furthermore, the present invention can be variously modified and practiced without deriving from the scope of the invention.

As has been explained above, a data communication apparatus according to the present invention comprises a receiver for receiving image data including a first character, an image storage device for storing image data corresponding to an action of a second character, specify means for specifying an action of the second character, readout means for reading image data of the second character corresponding to the action specified by the specify means from the image storage device, a transmitter for transmitting image data containing the second character obtained by the readout means, a synthesizer for synthesizing the image data received by the receiver and the image data transmitted by the transmitter, and a display for displaying image data obtained by the synthesizer and containing the first and second characters.

According to the above data communication apparatus, it is possible to display image data which seems as if first and second characters have a conversation through their own actions, by a simple operation, so that much closer communication of intentions can be made between persons conducting data communication.

Also, a data communication apparatus according to the present invention comprises a receiver for receiving image data containing a first character and action information thereof, an image storage device for storing image data corresponding to action information of a second character, a responding action storage device for storing the action information of the second character corresponding to the action of the first character, action information retrieve means for reading, from the responding action storage device, the action information of the second character corresponding to the action information of the first character received by the receiver, readout means for reading image data of the second character from the image storage device, based on the action information of the second character obtained by the action information retrieve means, a transmitter for transmitting image data containing the second character obtained by the readout means, a synthesizer for synthesizing the image data received by the receiver and the image data obtained by the readout means based on the respective action information, and a display for displaying a synthesized image containing the first and second characters.

According to the above data communication apparatus, even if a user of the device in the receiving communication device cannot make an instantaneous response, an automatic response is made by sending by return an image responding to the image from the caller, and images transmitted and received through this process are synthesized into one image containing the first and second characters. In this manner, communication of intentions with the user as the caller can be made without requiring labor to the user as the receiver, and the contents of the communication can be confirmed.

Further, a data communication apparatus according to the present invention comprises a storage device for storing the synthesized image data. Therefore, the transmitted and received image data can be once stored and thereafter can be displayed and confirmed.

Further, in a data communication apparatus according to the present invention, the image storage device stores a plurality of image data items of second characters, the receiver further receives identification information of a sender who transmitted image data. A suitable second character is selected among the plurality of second characters stored in the image storage device based on the identification information of the sender received by the receiver.

Therefore, it is possible to make a response, using characters respectively corresponding to callers. More appropriate communication of intentions can be made, reflecting intentions of users.

Further, in a data communication apparatus according to the present invention, the image storage device stores a sequence of image data items corresponding to an action. A sequence of image data items corresponding to an action is read from an action storage device.

Therefore, image data depending on animated display of characters is displayed so the expression performance can be improved more.

In a data communication method according to the present invention, when an action of a predetermined character is instructed, image data corresponding to the action is transmitted based on the instructed action of the predetermined character.

According to this method, it is possible to transmit image data which seems as if characters are taking actions according to intentions of users, while simplifying the operation, so that much closer communication of intentions can be made between persons conducting data communication.

Further, a data communication method according to the present invention further comprises a step of transmitting image data corresponding to action information indicating a plurality of actions of a predetermined character, together with the action information, and an action transmission step of transmitting the action information when an action of a predetermined character a character is instructed.

According to this method, particularly if it is necessary to transmit image data by which a character repeats an action, the amount of data to be transmitted is reduced so efficient data communication can be realized.

Further, in a data communication method according to the present invention, sequential action instruction information for instructing an action subsequent to the predetermined action is further transmitted in the image transmission step.

By adopting this method, it is possible to perform expression depending on sequential actions of a character.

Further, according to the present invention, it is possible to provide a storage medium which stores a program containing a program code for making a computer execute reception processing for receiving image data of a character of another party, image read processing for reading image data corresponding to an instruction, from an image data storage device, when an action of a character of a user is instructed by operating an operation member, transmission processing for transmitting the read image data of the character of the user, to the terminal of the other party, and synthesize processing for synthesizing received image data of the other party and the image data of the character of the user, and for displaying synthesized data.

According to this storage medium, it is possible to display image data which seems as if two characters of the user and the other party have a conversation through their own actions, by a simple operation, so that much closer communication of intentions can be made between persons conducting data communication.

Further, according to the present invention, it is possible to provide a storage medium which stores a program containing a program code for making a computer execute reception processing for receiving image data of a character of another party and action information, image read processing for reading image data of the character of a user, corresponding to the received action information, from an image data storage device, transmission processing for transmitting the read image data of the character of the user, to the other party, and synthesize processing for synthesizing the received image data and the read image data, and for displaying synthesized.

According to this storage medium, even if a user of the device in the receiving communication device cannot make an instantaneous response, an automatic response is made by sending by return an image responding to the image from the caller, and images transmitted and received through this process are synthesized into one image. In this manner, communication of intentions with the user as the caller can be made without requiring labor to the user as the receiver, and the contents of the communication can be confirmed.

What is claimed is:

1. A data communication apparatus comprising:

a receiver for receiving a first character representing a communication target;

an action storage for storing data representing various actions of a second character representing a user;

a specifying device for specifying an action of the second character by using an operation member;

a transmitter for reading the data of the second character corresponding to the action specified by the specifying device from the action storage and for transmitting the data read from the action storage to the communication target; and a synthesizer for synthesizing the data received by the receiver and the data read from the action storage and for displaying a synthesized image having the first and second characters meeting each other.

2. An apparatus according to claim 1, further comprising:
   a storage device for storing the synthesize image.

3. An apparatus according to claim 1, in which
   the action storage stores data representing various actions of a plurality of second characters;
   the receiver receives identification information of a sender who transmitted data; and
   the transmitter selects one of the second characters stored in the action storage based on the identification information of the sender received by the receiver.

4. An apparatus according to claim 1, in which
   the action storage stores a sequence of image data items corresponding to each action; and
   the transmitter reads a sequence of image data items corresponding to each action from the action storage.

5. A data communication apparatus according to claim 1, in which data representing the characters and data representing the action are transmitted and received in form of bitmap data.

6. A data communication apparatus according to claim 1, in which data representing the characters and data representing the action are transmitted and received in form of code data and are developed into bitmap data.

7. A data communication apparatus comprising:

a receiver for receiving a first character representing a communication target and action information representing an action of the first character;

an image storage for storing data representing various actions of a second character representing a user;

a response action storage for storing action information of the second character responding to the action information of the first character; and a transmitter for reading the action information of the second character responding to the action information of the first character received by the receiver from the response action storage, for reading the image data corresponding to the action information of the second character from the image storage, and for transmitting the action information read from the response action storage and the image data read from the image storage to the communication target.

8. An apparatus according to claim 7, further comprising:
   a synthesizer for synthesizing the data received by the receiver and the data read from the image storage; and
   a display for displaying a synthesized image having the first and second characters.

9. An apparatus according to claim 7, further comprising:
   a storage device for storing the synthesized image.

10. An apparatus according to claim 7, in which
    the action storage stores data representing various actions of a plurality of second characters;
    the receiver receives identification information of a sender who transmitted data; and
    the transmitter selects one of the second characters stored in the action storage based on the identification information of the sender received by the receiver.

11. An apparatus according to claim 7, in which
    the action storage stores a sequence of image data items corresponding to each action; and
    the transmitter reads a sequence of image data items corresponding to each action from the action storage.

12. A data communication apparatus according to claim 7, in which data representing the characters and data representing the action are transmitted and received in form of bitmap data.

13. A data communication apparatus according to claim 7, in which data representing the characters and data representing the action are transmitted and received in form of code data and are developed into bitmap data.

14. A computer program product comprising:

a computer readable first program code for receiving image data of a character of a target user;

a computer readable second program code for, when an action of a character of a user is instructed by operating an operation member, reading image data corresponding to the instruction from an image data storage device;

a computer readable third program code for transmitting the read image data of the character of the user to the target user; and a computer readable fourth program code for synthesizing and displaying the received image data of the character of the target user and the image data of the character of the user, wherein the image data of the character of the target user and the image data of the character of the user are shown meeting each other.

15. A computer program product comprising:

a computer readable first program code for receiving image data and action information of a character of a target user;

a computer readable second program code for reading image data of a character of a user corresponding to the action information from an image data storage device;

a computer readable third program code for transmitting the read image data of the character of the user to the target user; and a computer readable fourth program code for synthesizing the received image data and the read image data.

16. A data communication method comprising the following steps of:

determining whether or not a receiver responds to a call from a caller;

setting a communication channel between the caller and the receiver if it is detected that the receiver has responded;

communicating two characters respectively representing the caller and the receiver between the caller and the receiver;

synthesizing two characters and displaying synthesized characters; and making a self character take an action specified by using an operating member and transmitting the self character taking the specified action to the other party, thereby communicating of intentions of the caller and the receiver by using the characters taking the specified action, wherein the characters are shown meeting each other.

17. A data communication method according to claim 16, in which the action of the character includes a motion of the character and a display of a predetermined message generated from the character.

18. A data communication method according to claim 16, in which the motion of the character is displayed in form of an animation or a symbolic subsidiary mark expressing the motion.

19. A data communication method comprising the following steps of:

determining whether or not a receiver responds to a call from a caller;

setting a communication channel if it is detected that the receiver has not responded;

transmitting a first character representing the caller from the caller to the receiver;

transmitting a second character corresponding to the caller from the receiver to the caller;

making the first character take an action specified by the caller and transmitting the first character taking the action from the caller to the receiver; and making the second character take an action corresponding to the action of the first character and transmitting the second character taking the action from the receiver to the caller.

20. A data communication method according to claim 19, in which the action of the character includes a motion of the character and a display of a predetermined message generated from the character.

21. A data communication method according to claim 20, in which the motion of the character is displayed in form of an animation or a symbolic subsidiary mark expressing the motion.

22. A data communication method according to claim 19, in which the receiver stores a series of images, informs of whether or not stored images exist during waiting for a call, and reproduces and displays the stored images if any in accordance with a reproduction instruction.

23. A computer program product comprising:

a computer readable first program code for receiving image data of a character of a target user;

a computer readable second program code for, when an action of a character of a user is instructed by operating an operation member, transmitting to the target user image data of a character of the user which corresponds to the instruction; and a computer readable third program code for synthesizing and displaying the received image data of the character of the target user and the image data of the character of the user, wherein the image data of the character of the target user and the image data of the character of the user are shown meeting each other.

24. A computer program product comprising:

a computer readable first program code for receiving image data and action information of a character of a target user;

a computer readable second program code for transmitting to the target user image data of a character of the user which corresponds to the action information; and a computer readable third program code for synthesizing the received image data and the read image data.

25. A computer data signal embodied in a carrier wave, said computer data signal comprising:

a computer readable first program code for receiving image data of a character of a target user;

a computer readable second program code for, when an action of a character of a user is instructed by operating an operation member, reading image data corresponding to the instruction from an image data storage device;

a computer readable third program code for transmitting the read image data of the character of the user to the target user; and a computer readable fourth program code for synthesizing and displaying the received image data of the target user and the image data of the character of the user, wherein the image data of the character of the target user and the image data of the character of the user are shown meeting each other.

26. A computer data signal embodied in a carrier wave, said computer data signal comprising:

a computer readable first program code for receiving image data and action information of a character of a target user;

a computer readable second program code for reading image data of a character of a user corresponding to the action information from an image data storage device;

a computer readable third program code for transmitting the read image data of the character of the user to the target user; and a computer readable fourth program code for synthesizing the received image data and the read image data.

27. A computer data signal embodied in a carrier wave, said computer data signal comprising:

a computer readable first program code for receiving image data of a character of a target user;

a computer readable second program code for, when an action of a character of a user is instructed by operating an operation member, transmitting to the target user image data of a character of the user which corresponds to the instruction; and a computer readable third program code for synthesizing and displaying the received image data of the character of the target user and the image data of the character of the user, wherein the image data of the character of the target user and the image data of the character of the user are shown meeting each other.

28. A computer data signal embodied in a carrier wave, said computer data signal comprising:

a computer readable first program code for receiving image data and action information of a character of a target user;

a computer readable second program code for transmitting to the target user image data of a character of the user which corresponds to the action information; and a computer readable third program code for synthesizing the received image data and the read image data.

* * * * *